(12) United States Patent
Hwang et al.

(10) Patent No.: US 9,872,181 B2
(45) Date of Patent: Jan. 16, 2018

(54) METHOD FOR TRANSMITTING DATA ON UNLICENSED BAND AND BASE STATION THEREFOR

(71) Applicant: LG ELECTRONICS INC., Seoul (KR)

(72) Inventors: Daesung Hwang, Seoul (KR); Joonkui Ahn, Seoul (KR); Hanbyul Seo, Seoul (KR); Seungmin Lee, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,280

(22) PCT Filed: Aug. 31, 2015

(86) PCT No.: PCT/KR2015/009120
§ 371 (c)(1),
(2) Date: Jan. 13, 2017

(87) PCT Pub. No.: WO2016/036081
PCT Pub. Date: Mar. 10, 2016

(65) Prior Publication Data
US 2017/0215082 A1 Jul. 27, 2017

Related U.S. Application Data

(60) Provisional application No. 62/046,179, filed on Sep. 5, 2014, provisional application No. 62/053,753, filed
(Continued)

(51) Int. Cl.
*H04W 72/00* (2009.01)
*H04W 16/14* (2009.01)
(Continued)

(52) U.S. Cl.
CPC ........... *H04W 16/14* (2013.01); *H04W 24/08* (2013.01); *H04W 72/082* (2013.01)

(58) Field of Classification Search
CPC .... H04W 16/14; H04W 24/08; H04W 72/082
(Continued)

(56) References Cited

U.S. PATENT DOCUMENTS 8,155,102 B1 4/2012 Hakola et al.
2006/0223448 A1 10/2006 Kruys
(Continued)

OTHER PUBLICATIONS

Lte Advanced, "3rd Generation Partnership Project; Technical Specification Group Radio Access Network; Evolved Universal Terrestrial Radio Access (E-TRA); Physical Channels and Modulation", Technical Specification, (Release 10), 3GPP TS, 36.211, V10.4.0, (Dec. 2011).

*Primary Examiner* — Nghi H Ly
(74) *Attorney, Agent, or Firm* — Birch, Stewart, Kolasch & Birch, LLP

(57) ABSTRACT

One disclosure of the present specification provides a method by which a long term evolution advanced (LTE-A)-based base station transmits data on an unlicensed band. The method can comprise the steps of: setting, by the base station, a listen before talk (LBT) configuration for determining whether to transmit signals of other nodes before transmitting data on the unlicensed band; measuring, by the base station, interference due to signals from other nodes during a preset measurement period; comparing the detected interference and a preset threshold value; changing the LBT configuration according to the comparison; and transmitting the changed LBT configuration to a terminal.

12 Claims, 11 Drawing Sheets

Related U.S. Application Data on Sep. 22, 2014, provisional application No. 62/074,670, filed on Nov. 4, 2014.

(51) Int. Cl.
*H04W 24/08* (2009.01)
*H04W 72/08* (2009.01)

(58) Field of Classification Search
USPC .................. 455/454, 423, 418, 422.1, 414.1
See application file for complete search history.

(56) References Cited

U.S. PATENT DOCUMENTS

| | | |
|---|---|---|
| 2008/0122581 A1 | 5/2008 | Bae et al. |
| 2011/0021153 A1 | 1/2011 | Safavi |
| 2011/0128895 A1 | 6/2011 | Sadek et al. |
| 2013/0163449 A1* | 6/2013 | Flammer, III .... H04W 74/0808 370/252 |
| 2016/0338019 A1* | 11/2016 | Ratasuk ................. H04L 5/001 |
| 2017/0127449 A1* | 5/2017 | Wang ................ H04W 74/0816 |

\* cited by examiner

METHOD FOR TRANSMITTING DATA ON UNLICENSED BAND AND BASE STATION THEREFOR

CROSS REFERENCE TO RELATED APPLICATIONS

This application is the National Phase of PCT/KR2015/009120 filed on Aug. 31, 2015, which claims priority under 35 U.S.C. § 119(e) to U.S. Provisional Application Nos. 62/046,179; 62/053,753; and 62/074,670 filed respectively on Sep. 5, 2014; Sep. 22, 2014; and Nov. 4, 2014, all of which are hereby expressly incorporated by reference into the present application.

BACKGROUND OF THE INVENTION

Field of the Invention
The present invention relates to mobile communication.
Related Art
3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, as more and more communication devices require greater communication capacities, efficient use of a limited frequency band is highly demanded for a next-generation wireless communication system. Even for a cellular communication system such as an LTE system, using 2.4 GHz, an unlicensed band used by the existing WLAN system, and 5 GHz, which is also an unlicensed band, for traffic bypassing is considered. This is called LTE-U.

A base station of an LTE system has to perform Carrier Sensing (CS) in order to transmit data in the unlicensed band. However, a WLAN or any other communication node may not exist in a specific area at a specific time due to Cell planning, and even if the WLAN or any other communication node exist, its degree of interference may interfere the base station of the LTE system when the base station uses the unlicensed band for data transmission.

Nonetheless, performing CS always in the unlicensed band may be inefficient.

SUMMARY OF THE INVENTION

Accordingly, a disclosure of the present specification has been made in an effort to solve the aforementioned problem.

To achieve the aforementioned object, one aspect of the present invention provides a method of method of transmitting data in an unlicensed band. The method may be performed by a Long Term Evolution Advanced (LTE-A)-based base station. The method includes: before transmitting the data in the unlicensed band, setting, by the base station, Listen Before Talk (LBT) configuration to determine whether other nodes transmit signals or not; measuring, by the base station, interference caused by the signals from the other nodes for a preset measurement period; comparing the measured interference with a preset threshold; changing the LBT configuration according to the comparison; and transmitting the changed LBT configuration to a terminal.

The LBT configuration may include one or more of the following: information on a Carrier Sensing (CS) period in which whether the unlicensed band is busy due to the other nodes is checked; information on a frequency of the unlicensed band; information on operation in a case where the unlicensed band is busy due to the other nodes; information on a Reserved Resource Period (RRP) that is a period in which the base station is capable of transmitting and receiving the data in the unlicensed band; information on a period length between an ending point of the RRP and a start point of a next CS period or a next RRP; RRP start timing information; information on an Inter-System Measurement Gap (ISMG); and information on a threshold for interference.

The changing of the LBT configuration may include changing the LBT configuration according to a type of a different node which causes interference greater than the preset threshold.

The method may further include: determining, in response to the interference greater than the preset threshold, whether the unlicensed band is busy. In response to a determination that the unlicensed band is busy, data transmission may not be performed.

The method may further include: determining, in response to the interference smaller than the present threshold, whether the unlicensed band is idle. In response to a determination that the unlicensed band is idle, data transmission may be prepared.

The changing of the LBT configuration may include gradually changing the LBT configuration according to size of the interference.

To achieve the aforementioned object, another aspect of the present invention provides a Long Term Evolution Advanced (LTE-A)-based base station which transmits data in an unlicensed band. The base station includes: a Radio Frequency (RF) unit; and a processor configured to control the RF unit. The processor may perform the following operations: before transmitting the data in the unlicensed band, setting Listen Before Talk (LBT) configuration required to determine whether to transmit signals of other nodes; measuring, by the base station, interference caused by the signals from the other nodes for a preset measurement period; changing the LBT configuration according to the comparison; and transmitting the changed LBT configuration to a terminal.

According to embodiments of the present disclosure, the aforementioned problem of the existing technology may be solved. More specifically, according to embodiments of the present disclosure, when communication is performed in an unlicensed band, it is possible to efficiently manage an overhead according to a situation of a neighboring communication node, thereby utilizing resources.

DESCRIPTION OF EXEMPLARY EMBODIMENTS

Figure 1:
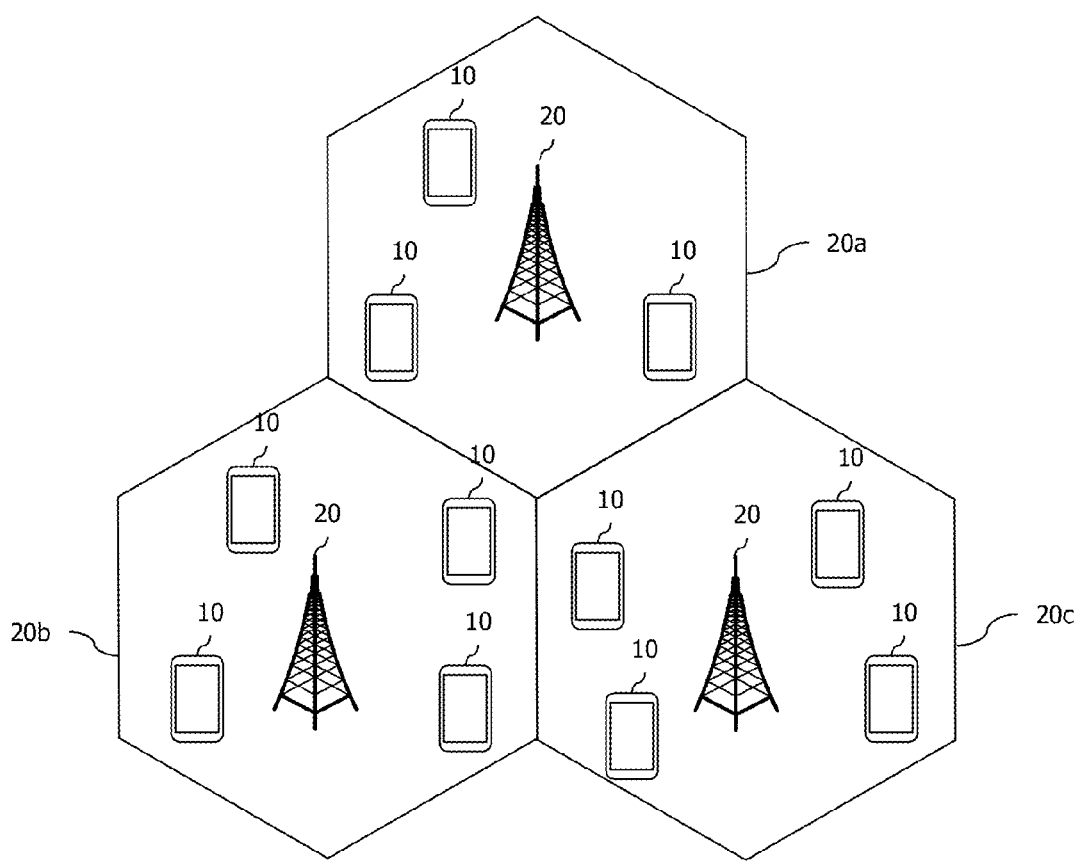
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
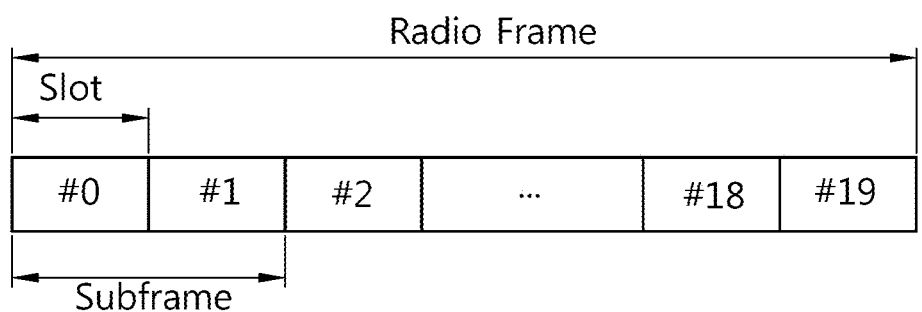
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the period 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
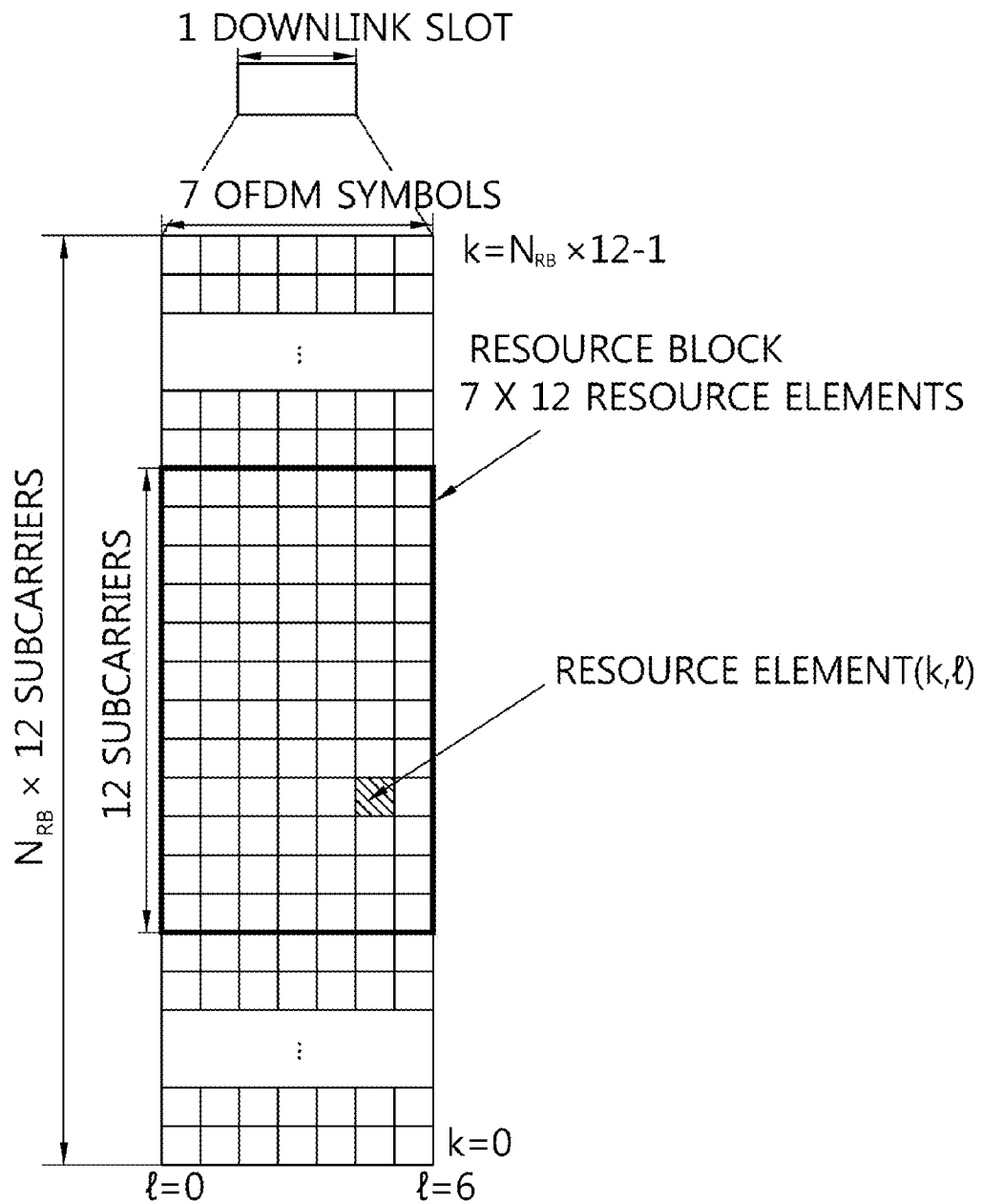
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
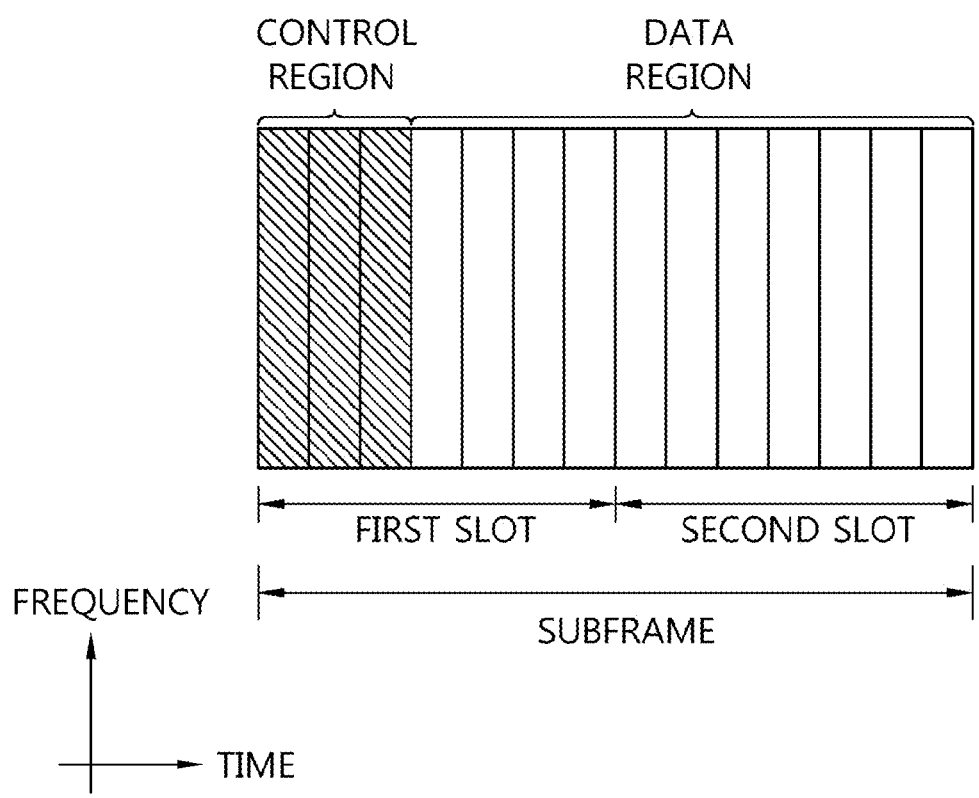
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
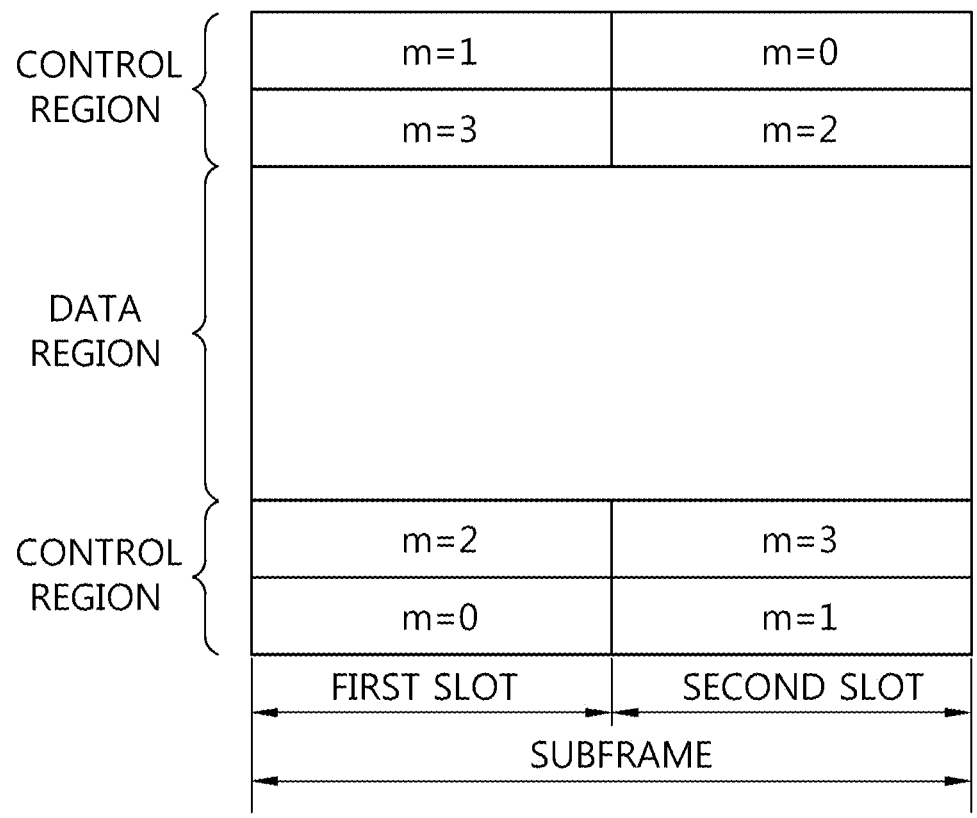
FIG. 5 illustrates the architecture of an uplink subframe in 3GPP LIE.
Figure 5:
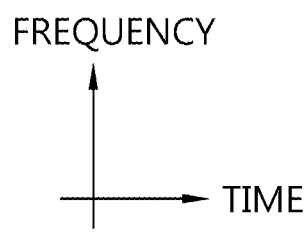

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed. For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time, and the like) assigned thereto.

<Wireless Local Area Network (WLAN)>

Hereinafter, operation of a WLAN will be described.

Figure 6A:
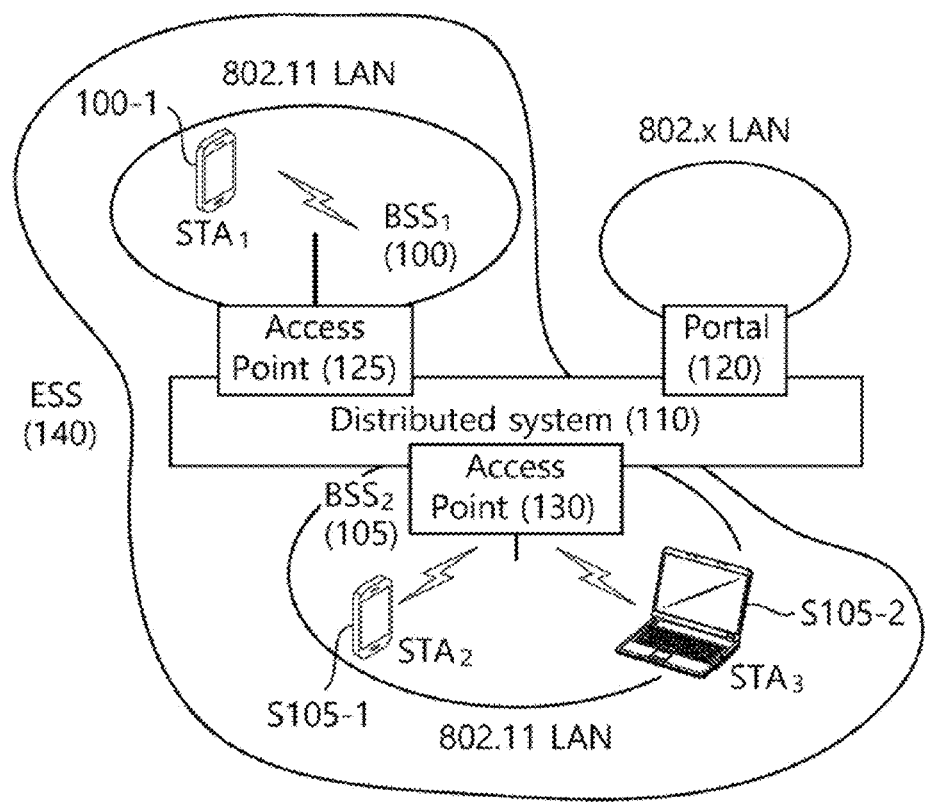
FIG. 6A is a conceptual diagram illustrating a configuration of a Wireless Local Area Network (WLAN.

FIG. 6A is a conceptual diagram illustrating the configuration of an WLAN.

FIG. 6A shows the configuration of an infrastructure network of an Institute of Electrical and Electronic Engineers (IEEE) 802.11.

Referring to FIG. 6A, a WLAN system may include one or more Basic Service Sets (BSS). Each of the BSSs 500 and 505 is a set of an Access Point (AP) 525 and a station STA1 500-1 which are able to be successfully synchronized and communicate with each other, and is not a concept indicating a specific area. The BSS 505 may include one or more STA 505-1 and 505-2 which may be combined with a single AP 530.

The infrastructure BSS may include at least one STA, APs 525 and 530 each providing a distribution service, and a Distribution System (DS) 510 connecting a plurality of APs with each other.

The distribution system may realize an extended service set (540) which is a service set being extended by connection of multiple BSSs 500 and 505. The ESS 540 may be used as a term indicating a single network consisting of one or multiple APs 525 and 530 connected through the distribution system 510. The APs included in the single ESS 540 may include the same Service Set Identification (SSID).

A portal 520 may act as a bridge which connects a WLAN network (IEEE 802.11) and another network (e.g., 802.X) with each other.

In the infrastructure network shown in FIG. 6A, there may be a network between the APs 525 and 530, and a network between the APs 525 and 530 and STAs 500-1, 505-2, and 505-2. However, it is possible to configure a network between STAs without the APs 525 and 530 and perform communication therein. A network which is configured between STAs without the APs 525 and 530 is defined as an Ad-Hoc network or an Independent Basic Service Set (IBSS).

Figure 6B:
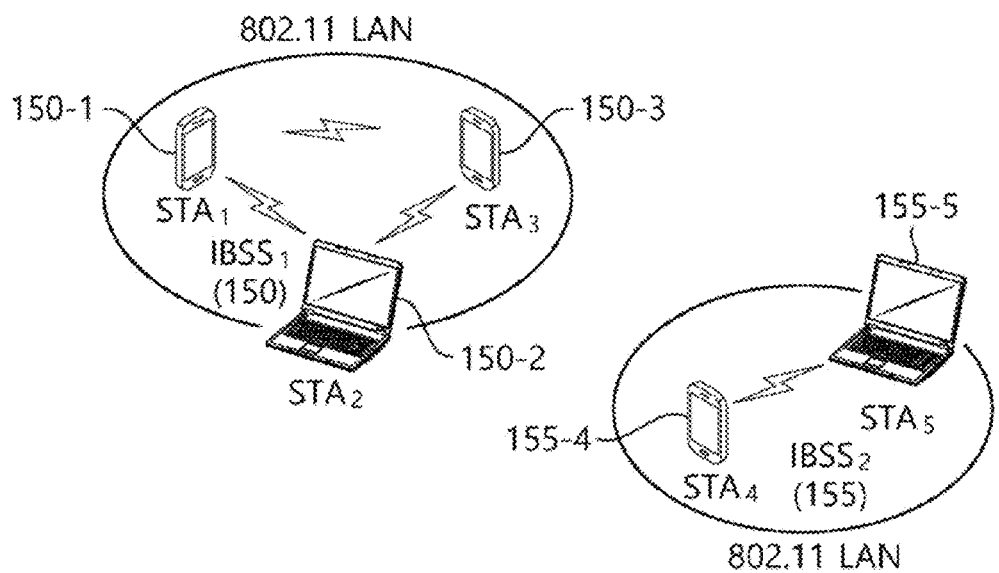
FIG. 6B is a conceptual diagram illustrating an independent Basic Service Sets (BSS).

FIG. 6B is a conceptual diagram illustrating an IBSS.

Referring to FIG. 6B, the IBSS is an BSS which operates in an Ad-Hoc mode. As the IBSS does not include any AP, there is no centralized management entity. That is, in the IBSS, the STAs 550-1, 550-2, 550-3, 555-4, and 555-5 are managed in a distributed manner. In the IBSS, each of the STAs 550-1, 550-2, 550-3, 555-4, and 555-5 may be a mobile STA and each of them is not allowed to access the distribution system, thereby forming a self-contained network.

An STA is an arbitrary function medium including a physical layer interface for a wireless medium and a Medium Access Control (MAC) complying with the requirements of the IEEE 802.11 standard, and, in a broad sense, it may mean an AP and a non-AP station (Non-AP STA).

The SAT may be referred to as a mobile terminal, a wireless device, a Wireless Transmit/Receive Unit (WTRU), a User Equipment (UE), a Mobile Station (MS), a mobile subscriber unit, a user, or any of other various names.

Figure 7A:
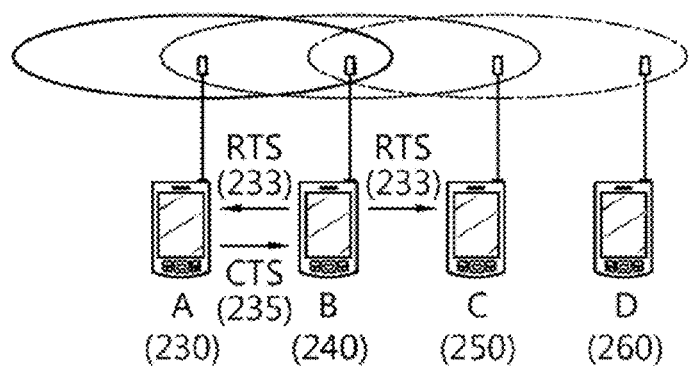
FIGS. 7A to 7B are conceptual diagrams illustrating a configuration of an WLAN.
Figure 7B:
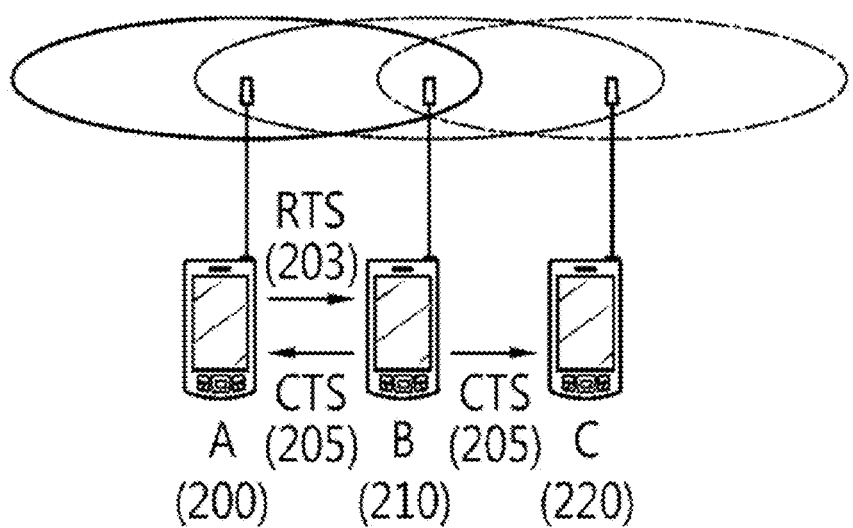

FIGS. 7A to 7B are conceptual diagrams illustrating a configuration of an WLAN.

Referring to FIGS. 7A and 7B, in order to solve a hidden node issue and an exposed node issue, a short signaling frame, such as a Request to Send (RTS) frame and a Clear to Send (CTS), may be used. Based on the RTS frame and the CTs frame, surrounding STAs may be aware of data transmission or reception between two STAs.

FIG. 7A shows a method of transmitting an RTS frame 203 and a CTS frame 205 in order to solve a hidden node issue.

It may be assumed that both of a STA A 200 and an STA C 220 are about to transmit a data frame to a STA B 210. Before transmission of the data frame, the STA A 200 may transmit an RTS frame to the STA B 210, and the STA B210 may transmit an a CTS frame 205 to the STA A 200. The STA C 220 may overhear the CTS frame 205 and may be informed, by a medium, of the transmission of a frame from the STA A 200 to the STA B 210. The STA C 220 may be set a Network Allocation Vector until transmission of the data frame from the STA A 200 to the STA B 210 is finished. In this manner, a collision between frames due to a hidden node may be prevented.

FIG. 7B shows a method of transmitting an RTS frame 233 and a CTS frame 235 in order to solve an exposed node issue.

The STA C 250 may determine whether a collision occurs when a frame is transmitted to a different STA D 260 based on monitoring of the RTS frame 233 and the CTS frame 235 between the STA A 230 and the STA B 240.

The STA B 240 may transmit the RTS frame 233 to the STA A 230, and the STA A 230 may transmit the CTS frame 235 to the STA B 240. The STA C 250 overhears only the RTS frame 233 transmitted by the STA B 240, and does not overhear the CTS frame 235 transmitted by the STA A 230. Thus, the STA C 250 is able to be aware that the STA A 230 is located beyond a carrier sensing range of the STA C 250. Therefore, the STA C 250 may transmit data to the STA D 260.

An RTS frame format and a CTS frame format are disclosed in 8.3.1.2 RTS frame format and 8.3.1.3 CTS frame format of IEEE P802.11-REVmc™/D2.0, October 2013.

<LTE-Unlicensed Spectrum (LTE-U)>

Recently, more and more communication devices require greater communication capacities, and thus, efficient use of a limited frequency band in a next wireless communication system is regarded highly significant. In a cellular communication system, such as an LTE system, a scheme for utilizing a unlicensed band of 2.4 GHz or 5 GHz, used by an existing WLAN system, for traffic bypassing. Such a scheme is an LTE-Unlicensed Spectrum (LTE-U).

Basically, it is assumed that wireless transmission and reception is enabled in an unlicensed band through competition between communication nodes, and thus, each communication node is required to perform channel sensing, before transmitting a signal, in order to check whether a different communication node is not transmitting a signal. This procedure is called Clear Channel Assessment (CCA), and even a base station or an UE in an LTE system may need to perform the CCA in order to transmit a signal in an unlicensed band (hereinafter, referred to as an LTE-U band for convenience of explanation). In addition, When the base station or the UE of the LTE system is transmitting a signal, an WLAN or any other communication node needs to perform the CCA and not to cause an interference. For example, in the WLAN standard (801.11ac), a CCA threshold value is defined as −62 dBm with respect to a non-WLAN signal, and as −82 dBm with respect to an WLAN signal. It means that, when a signal power equal to or greater than −62 dBm, other than a WLAN signal, is received, an STA or an AP does not transmit a signal not to cause interference. In particular, if a signal equal to or greater than the CCA threshold value is not detected for 4 us or more, an STA or an AP in the WLAN system performs CCA and transmit a signal.

Hereinafter, for convenience of explanation, a base station and a terminal in the LTE/LTE-A system are referred to as a base station and an UE, respectively, and a base station and a terminal in the WLAN system are referred to as an AP and an STA, respectively.

Various systems are used in an unlicensed band, but an WLAN system based on IEEE 802.11 is expected to have the greatest influence in the LTE-A system and to be most influenced when the LTE-A system is used in an unlicensed band. Basic operations of the WLAN system are presumed to be carrier sensing (CS) of Carrier Sense Medium Access/Collision Avoidance (CSMA/CA)/ In the WLAN system, all STAs including APs are compelled to perform carrier sensing (CS).

Figure 8:
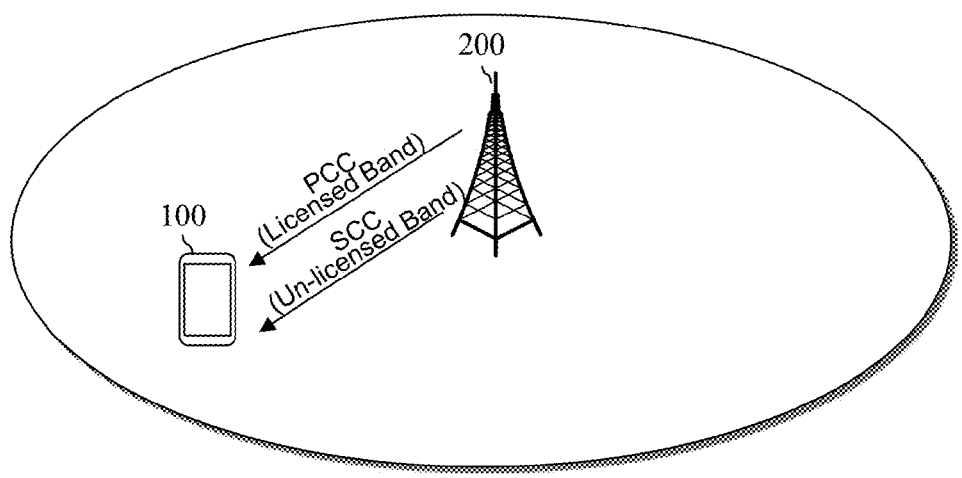
FIG. 8 shows an example in which a licensed band and an unlicensed band are used as carrier aggregation (CA).

FIG. 8 illustrates an example in which a licensed band and a unlicensed band are used as a carrier aggregation (CA).

In one embodiment of the present disclosure, in order to transmit and receive a signal using a carrier of a unlicensed band of which exclusive use is not guaranteed for a specific system, a base station 200 or an UE 100 may transmit a signal to each other by the LTE-A band, which is a licensed band, and a CA which is a unlicensed band. Here, for example, a carrier in a licensed band may be interpreted as a Primary CC (PCC or PCell), and a carrier in a unlicensed band may be interpreted as a Secondary CC (SCC or SCell). However, methods proposed in the present disclosure may be applied even in a case where a plurality of licensed bands and a plurality of unlicensed bands are used for CA schemes, and may be applied even in a case where signal transmission and reception between a base station and an UE are enabled only in a unlicensed band. In addition, the methods proposed in the present disclosure may be applied not only in the 3GPP LTE system, but in a different system having different characteristics.

Meanwhile, as an example of operation in a unlicensed band, which is operation by a competition-based arbitrary access method, a base station 200 may perform CS before transmitting or receiving data. If the current channel status of a SCell operating in a unlicensed band is busy or idle is checked, and, if the current channel status of the Scell is idle, the base station 200 may transmit scheduling grant through an (E)PDCCH of a PCell, which is a Cross Carrier Scheduling (CCS), or through an (E)PDCCH of the SCell, and then attempt to transmit or receive data.

Figure 9:
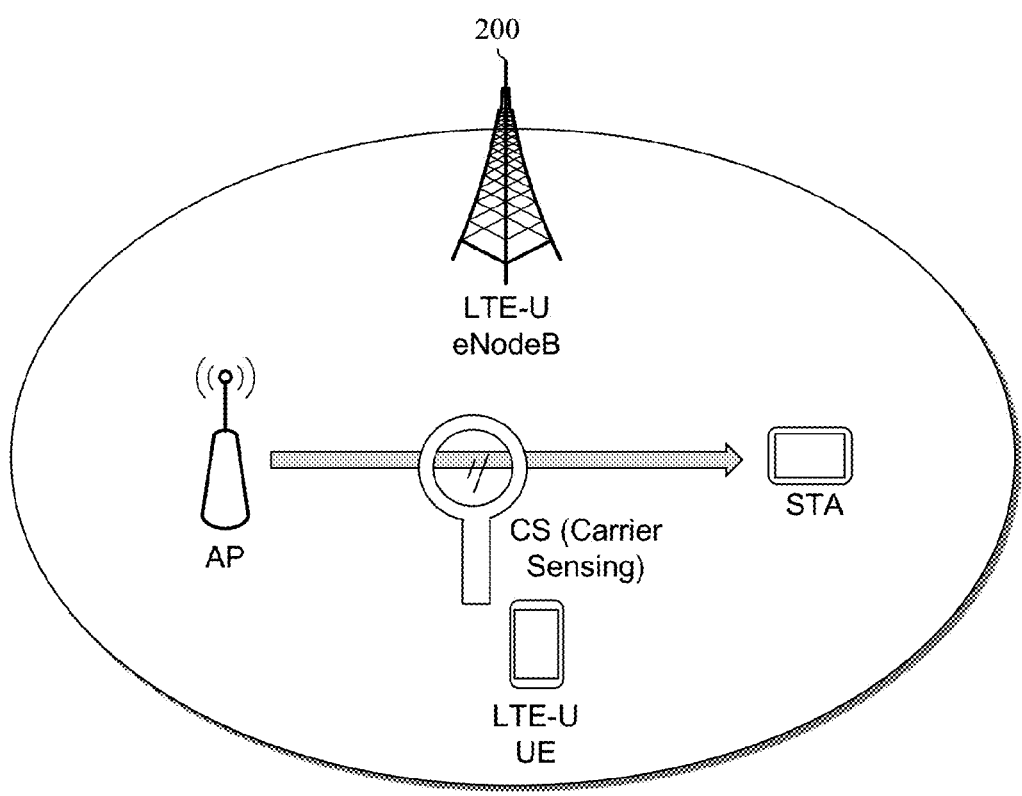
FIG. 9 shows an example in which an User Equipment (UE) performs carrier sensing (CS) before using an unlicensed band.

FIG. 9 illustrates an example in which an UE performs CS before using a unlicensed band.

Unlike a licensed band, a unlicensed band basically assumes to obtain a wireless transmitting and receiving opportunity through competition with other communication nodes, so each communication node is required to perform CS and the like before transmission of a signal in order to check transmission of a signal with respect to other communication nodes.

That is, as shown in FIG. 9, when an AP and a STA in a WLAN system transmit and receive data in an unlicensed band, an UE supports LTE-U needs to perform CS first to transmit data in the unlicensed band. As such, performing CS before transmitting data may be defined as listen before talk (LBT). In this case, if any other communication node does not transmit a signal, it may be defined such that CAA is confirmed.

Meanwhile, due to cell planning, a WLAN or any other communication node may or may not exist at a specific time in a specific region. Even when the WLAN or any other communication node exists, its degree of interference may or may not affect a base station of the LTE system when the base station uses a corresponding unlicensed band for transmission. Under these circumstances, checking communication situation, such as LBT, CS, and CCA conformation, may be inefficient.

<Detailed Embodiments of the Present Disclosure>

Accordingly, one embodiment of the present disclosure proposes a method of adaptively changing a parameter regarding a period/frequency of a procedure of checking LBT, CS, CCA, and the like according to surrounding communication environment (e.g., according to an amount of interference from other communication nodes or a transmission status).

As described above, downlink (DL) transmission by a base station in an unlicensed band may not be unnecessarily guaranteed, and thus, an LTE UE operating in the unlicensed band may keep accessing another cell operating in a licensed band for purposes of mobility and stable control of an RRM function and the like. For convenience of explanation, in the present disclosure, a cell over which an UE accesses a unlicensed band is called a USCell, and a cell over which an UE accesses a licensed band is called a PCell. It is obvious that the present disclosure is able to be applied even in a case where an UE accesses the unlicensed band over the PCell.

First, one embodiment of the present disclosure proposes that LBT includes one or more combinations of the following information.

i) Information on a length of CS period: It is a period for measuring interference in order to determine whether a unlicensed band is busy due to any other communication node, before an LTE base station determines to transmit data in the unlicensed band, and it indicates a minimum/maximum/average/fixed length of the period. In addition, a unit of change of the CS period length may be considered. In addition, the CS period may determined in advance according to a regulation (for example, an area in which the CS procedure is operable).

ii) Target frequency information: Target frequency information may include information on which frequency region is to be used for performing CS on an unlicensed band. For example, a list of frequencies, on which CS is performed with respect to a WLAN, and a list of frequencies, on which CS is performed with respect to an LTE-U cell of an inter-operator, may be set differently. More specifically, frequencies performing CS with respect to the WLAN may be frequencies of a primary channel used by a neighboring AP. Here, information on the primary channel may be obtained through measurement of a base station or a terminal. As such, when different frequency lists are given, different information for the CS procedure may be given for each of the list, and different requirements of the CS procedure may be given for each of the multiple frequencies.

iii) Operation for a busy channel: When it is assumed that a target channel is used (in a busy state) by a base station or a UE, it is possible to include information on whether the base station will change LBT configuration, stops communications, or changes a frequency band to reattempt CS. In this case, a different scheme may be applied according to inter-operator interference and interference by the WLAN system. For example, if interference by the WLAN system is estimated, it is possible to change a frequency band or reduce power. In addition, if interference by an inter-operator is estimated and a frequency of the interference is a selected frequency, it is possible to increase transmission power or stop communication. This case may correspond, for example, to a case where a channel/frequency to be used between operators is set in advance. Ion addition, if a channel allocated to a specific operator is busy so the specific operator is now using a channel of an inter operator, the specific operator may stop its operation upon estimation of interference. Alternatively, if interference of an inter operator is found in a channel allocated to a specific operator, the specific operator may increase power to operate.

iv) Reserved Resource Period (RRP) period length information: I indicates a minimum/maximum/average/fixed length of a period in which an LTE base station is able to transmit and receive data in an unlicensed band. In addition, a unit of change of the RRP length may be considered. In addition, different RRP length information may be set for an area or frequency according to a regulation, a different standard, or OAM. In addition, in a case where there is interference by the WLAN system, where a neighboring radar system is detected, where there is LTE interference, the RRP length may be changed.

v) Non-LBT period length information: It indicates a minimum/maximum/average/fixed length of a non-transmission period, after the RRP, with respect to an unlicensed band of an LTE base station. It may be interpreted as a period starting after the end of a previous RRP and ending upon the start of the next CR procedure, or as a period starting after the end of a previous RRP and ending upon the start of a next RRP. In addition, a unit of change of a non-LBT period length may be considered. A period by the corresponding parameter is a period of enabling muting, and thus, it may be set differently by an interference estimation system. Specifically, if interference from a different inter-operator, it is possible to configure a non-LBT period as long as a predetermined length. In the case of a WLAN system, a period length may be changed according to a degree of interference or the number of APs.

vi) Back-off period length information: It indicates a maximum/minimum/fixed back-off length to be actually applied. In addition, a unit of change of the maximum/minimum/fixed length of the back-off period may be considered.

vii) Information on a timing at which an RRP starts or at which LBT starts.

viii) Inter-System Management Gap (ISMG) information: it may include a cycle, gap, and length of an ISMG.

ix) Threshold of interference: It may include a threshold of interference from a different LTE base station, and a threshold of interference from a non-LTE node.

Here, a threshold of interference corresponding to a different LTE base station may be classified as a threshold of interference from the same group or as a threshold of interference from a different group. Groups may be configured such that base stations corresponding to the intra operator may be set as a first group, and base stations corresponding to an inter operator may be set as a second group. In addition, groups may be according to whether coordination is possible. Here, a threshold of interference from a non-LTE node may be set with respect to an WLAN node or with respect to a non-WLAN and non-LTE node (e.g., Bluetooth). Even with respect to the WLAN node, a threshold is set differently for an AP and an UE. Here, a threshold may be used as a value referenced by an LTE base station when the LTE base station measure interference generated by a neighboring node to determine whether to transmit a signal over an unlicensed band. In other words, before measuring interference generated by a neighboring node, a base station or an UE may perform a procedure of determining whether a corresponding signal is an LTE signal or a non-LTE signal, and this procedure may include receiving a preamble or a known signal (e.g., a cell-specific/UE-specific/AP-specific signal, or a discovery signal). Here, the LTE signal may be classified as a signal from the same group or as a signal from a different group. For example, groups may be configured according to whether they belong to the intra operator. A non-LTE signal may be classified as a WLAN signal, as a non-WLAN signal, or as a non-LTE (e.g., Bluetooth) signal. Meanwhile, an LTE base station and a WLAN node may exist together in the same group. In a specific example of using a threshold of interference, a base station or an UE may perform operations as following: (1) detecting a signal (e.g., a preamble) received from a neighboring node and determine a type to which the signal belongs (an LTE base station of the intra operator, an LTE base station of an inter operator, a WLAN node, etc.); (2) comparing an independently set threshold with measured interference according to the determined type of the signal; (3) determine, by the base station, whether to prepare for transmission or performing signaling, by the UE, on the corresponding state with respect to the base station. If a system type is not determined despite the detection of the preamble or known signal (e.g., a discovery signal), it is assumed that the interference is from an inter operator/group or from the same system, and then the rest procedures may be performed. Power for a preamble or a known signal may be excluded from the procedure (2), and this procedure may be limited to a case where a preamble or a known signal is detected again. Here, setting a different threshold according to an interference source may be extended such that a threshold is set differently (independently) according to an interference resource which is set in an upper layer or which is set in advance.

Meanwhile, depending on network environments, actively adjusting LBT configuration may improve efficiency of the use of an unlicensed band. For example, when there are many other communication nodes in the surroundings or interference is greater than a specific threshold, CS is performed frequently or an LBT period is set frequently, and, when there are few other communication nodes and the other nodes perform communication sporadically, CS may be performed less frequently or an LBT period is set less frequently. Alternatively, when a few number of base stations or base station groups uses the corresponding unlicensed band, CS and/or LBT is performed frequently, and when there are large traffics, CS and/or LBT may be performed sporadically. The procedure of changing the LBT configuration may be performed by each UCell or each base station or may be performed by a cell/base station which is expressed in the form of information, which is set in advance or which is set in an upper layer, that may be transmitted and received through a backhaul. As an example of a cell/base station group, a cell/base station corresponding to the intra operator may be set.

Hereinafter, examples of conditions for changing LBT configuration (e.g., increasing or reducing an RRP length, setting the same as a default value, etc.) will be described.

i) Condition A: LBT configuration may be changed when information on change of LBT configuration by a specific base station is shared among base stations through a backhaul. Here, the specific base station may be referred to as a base station of a macro cell, or a master base station. In this case, change of the LBT configuration may be informed to an UE through upper layer signaling, and the UE may perform LBT based on the signaling. A base station may change LBT configuration based on measurement of interference on a neighboring communication node and traffic state of the corresponding base station/UE. Alternatively, in consideration of an inter operator, such information may be exchanged via an air interface. A signal/channel transmitting and receiving such information may be, for example, an SIB, and LBT information of its own may be broadcasted by introducing a new SIB. In particular, such information may be an SIB that a terminal does not read, and neighboring cells having received LBT information may adjust their own LBT or request to adjust LBT. A request to adjust LBT may be transmitted through backhaul signaling or may be exchanged via an air-interface.

In the above, a period for measuring interference may be (a) an non-RRP or a CS period, or may be (b) a subframe set within the RRP, for example, an ISMG.

ii) Condition B: Suppose that there is a present threshold for each base station or a preset threshold shared between base station groups. Each base station or each base station group measures interference generated by different communication nodes, and, if the measured interference is greater than a threshold or if an increase or decrease in the trend of measurement of the interference is greater than a threshold, each base station or each base station group may change LBT configuration. If a preset or shared preamble/known signal exists, the interference may exclude power of the preamble or the known signal. The power may be excluded only in a case where the preamble or the known signal is detected. More particularly, there may be multiple thresholds, and there may be multiple LBT configurations corresponding to the respective thresholds. If multiple LBT configurations exist, a network may select any one of the LBT configurations according to a circumstance. In addition, a threshold or a threshold set may be set differently according to a type of an interference source (e.g., an LTE node, a non-LTE node, an LTE base station of an inter operator, a base station of the intra operator, a WLAN node, an LTE base station of the same group, an LTE base station of a different group, and a different WLAN node). In a method of distinguishing a type of an interference source, an LTE base station and a WLAN node may exist in the same group when groups are configured. In the above, setting a different threshold according to an interference source may be extended into setting a threshold differently (independently) according to an interference source which is set in an upper layer or which is set in advance. Setting a threshold may be performed in an upper layer.

ii-1) The interference may be measured by a base station. As such, if a base station or a base station group measures interference, the changed LBT configuration information may be informed to an UE by an upper layer signal over a PCell.

ii-2) The interference may be measured by an UE. As such, if the UE measures interference, a measurement result may be reported to a PCell, a base station, or a base station group by an upper layer signal. Then, the PCell, the base station, or the base station group may aggregate received information, change LBT configuration, and transmit the changed LBT configuration information to the UE through the upper layer. In this case, the UE may set an (E)PDCCH monitoring region according to each period. The UE may estimate an ON/OFF pattern of its own serving cell based on the acquired information, or may use the acquired information for perform measurement. Alternatively, quality of a serving cell may be estimated based on LBT information. For example, if information indicating whether a non-RRP in a corresponding LBT is too long or too short is used as estimated potential utilization of a serving cell, the UE moves over a cell or switches a frequency based on the information.

Here, a period for measuring interference may be limited to (1) a non-RRP or a CS period, or may be limited to a specific subframe set within an RRP, for example, an ISMG.

iii) Condition C: An LTE UE or an LTE base station may transmit an RRP end message at an ending point of an RRP or in an attempt to finish the RRP. Alternatively, a base station may set a non Tx period and share information of the non Tx period with a different base station through backhaul signaling or through an air interface (new L1 channel). At this point, if an RRP end message or a non Tx period configuration-related signal is received from a different LTE-U base station, a base station may change LBT configuration. More specifically, the RRP end message or the non-Tx period configuration-related signal may include information on a next LBT configuration. For example, if a base station, after using a unlicensed band, stops an RRP because there is no information to transmit, the base station may broadcast, through backhaul signaling or through an air interface, a message to inform the neighboring base station environment of the end of RRP, and a base station or a base station group having received the message may start to perform LBT or CS or may change LBT configuration. Alternatively, a base station or a base station group may estimate an ending point of the RRP based on the previously shared information on the RRP or information on a length of a communication period of different communication nodes. An UE may acquire the changed LBT configuration information through an upper layer.

The RRP end message or the non Tx period configuration-related signal may be transmitted when a base station does not have information to be scheduled to a corresponding UE or when an UCell is not used for a predetermined period. In addition, a time and method of changing LBT configuration may be changed according to a system type with respect to an interference source (LTE/Non-LTE/WLAN, whether it belongs to the intra/inter operator, whether it belongs to the same base station/cell group, etc.). In addition, each parameter for configuring LBT may be set independently according to a type of an interference source or a situation of a neighboring system. For example, LBT configuration for solving WLAN interference and LBT configuration for solving LTE interference nay be different.

The above methods may be used as a criterion for selecting a channel for data transmission and reception from among a plurality of frequency channels (carriers) that a base station/UE is able to use in an unlicensed band. That is, if there is a different interference on a network, as described in Condition B, an UE may select a channel by distinguishing an interference level or a signal receiving power of each interference source.

In a specific example, if interference generated by a non-LTE or a WLAN is greater than a specific threshold, an UE may exclude a channel corresponding to the non-LTE or the WLAN preferentially over other channels. In addition, if great interference or signal caused by a node of an inter operator exits in a LTE, a channel corresponding to the LTE may be excluded preferentially over other channels. In the above, an interference/signal sources are distinguished by different measurement periods, different signal groups (cell ID, PSS/SSS sequence group, RS sequence group, preamble sequence group), etc. Information about selection or exclusion of a channel measured by the UE may be signaled to a base station. In this case, the signal may be transmitted from a PCell or on a licensed band.

For example, an LTE base station and a UE may perform LBT as a default setting in the initial stage. A value of the default setting may be set by the base station and signaled to the UE. For example, interference is measured in a CS period or in an ISMG which is set in advance or which is shared through backhaul, and the base station compares the measured interference with a threshold set for the entire interference or for interference of each system type, and then changes LBT configuration information when performing the next or N-th and following LBT. In the above, if a preset or shared preamble or a known signal exists, power of such a preamble or signal may be excluded from the interference. In this case, when the preamble or known signal is detected, power thereof may be excluded. The threshold may be set differently according to a type of an interference source (e.g., an LTE node/a Non-LTE node/an LTE base station of the intra or inter operator/an LTE base station of an WLAN node or of the same group/an LTE base station of a different group/a WLAN node). In the above, setting a threshold differently according to an interference source may be extended into setting a threshold differently (independently) according to an interference source which is set in an upper layer or which is set in advance. Setting a threshold may be done in the upper layer. The criteria for change may be selected from the following: (1) increasing or decreasing a length of each of the CS/LBT/Back-off/RRP according to a value set for each period by comparing interference with a threshold; and (2) dividing an interference value into steps using a plurality of thresholds, and increasing or decreasing a length of each CS/LBT/Back-Off/RRP to be a multiple of a corresponding step. More specifically, when WLAN interference is estimated, performing CS despite reduction in interference may be excluded from options. Alternatively, if an WLAN AP exists nearby, it is not necessary increase or decrease even though interference is reduced. More specifically, LBT configuration may be changed based on the number of neighboring WLAN APs or loads. In particular, LBT configuration about WLAN interference may be applied upon detection of interference in a predetermined pattern: however, when it comes to LTE interference, the LBT configuration may be changed adaptively according to a degree or frequency of the interference.

The length of the CS/LBT/Back-off period may be reduced on the basis of a step unit, when interference is smaller than a threshold. On the other hand, when interference is greater than the threshold, each of those periods may be configured as indicated by a default setting. Similarly, the length of the RRP may be increased on the basis of a step unit, when interference is smaller than a threshold. On the other hand, when interference is greater than the threshold, the RRP may be configured as indicated by a default setting. A case where the interference is greater than the threshold value may be a case where an interference source is a non-LTE system or any communication node of a different base station group. In other cases, increasing or decreasing on the basis of a step unit may be performed.

In other cases apart from the CS/LBT/RRP/Non-LBT periods, A threshold for interference may be adaptively changed. For example, if a different communication node is not detected for a predetermined period of time (when interference is smaller than a set threshold), the threshold may be reduced: the threshold may be increased when interference is increased for a measurement period. In this case, if a different communication node is not detected continuously, a base station may increase Tx power: when interference becomes greater than a reduced threshold, the base station may increase the threshold and decrease the Tx power. On the other hand, if a different communication node is not detected for a predetermined period of time (when interference is smaller than a set threshold), the base station may increase the threshold.

Hereinafter, backhaul signal information necessary for implementing the aforementioned methods will be described.

The following information may be shared among base stations, base station groups, or communication nodes in a network, and the information may be conveyed to an UE by an upper layer signal. Alternatively, if an UE performs sensing, the sensing result or feedback about LBT configuration change information may be informed to a base station by an upper layer/L2/L1 signal. Only some of combinations of the following backhaul signals may be considered according to a method.

i) LBT configuration information: It may be a combination of the aforementioned information. IT may include a value for changing the LBT configuration. It may include the current status of LBT configuration of each LTE base station.

ii) CS result (interference information): It may be represented as an interference value measured by each base station, a quantized value, a value set through comparison with a corresponding threshold, or information as to whether a corresponding LTE base station is able to use a measurement carrier. In addition, the above types of information may be set differently according to a type of a communication node, the intra/inter operator, the same base station/cell group, LTE/non-LTE, and LTEWLAN.

iii) RRP or Tx period end information: It may include packet information (transmitted packet size, the entire packets, the remaining packet size, etc.), an expected/fixed RRP ending point, or a Tx period ending point.

iv) LBT change method information: It may include information required for changing LBT based on CS result or a measurement in an ISMG. For example, information on how to operate when interference is greater than a threshold, and information on how to operate when interference is smaller than the threshold may be shared among base stations in a network. In addition, an LBT change method may be set independently according to a type of a communication system (LTE/WLAN/Non-LTE, the intra or inter operator, the same base station/cell group), and may be signaled.

All or some of the combination of the above information may be transmitted to an UE by an L1/L2/RRC signal, and, based on the signal, the UE may perform measurement and redefine an (E)PDCCH monitoring region.

Figure 10:
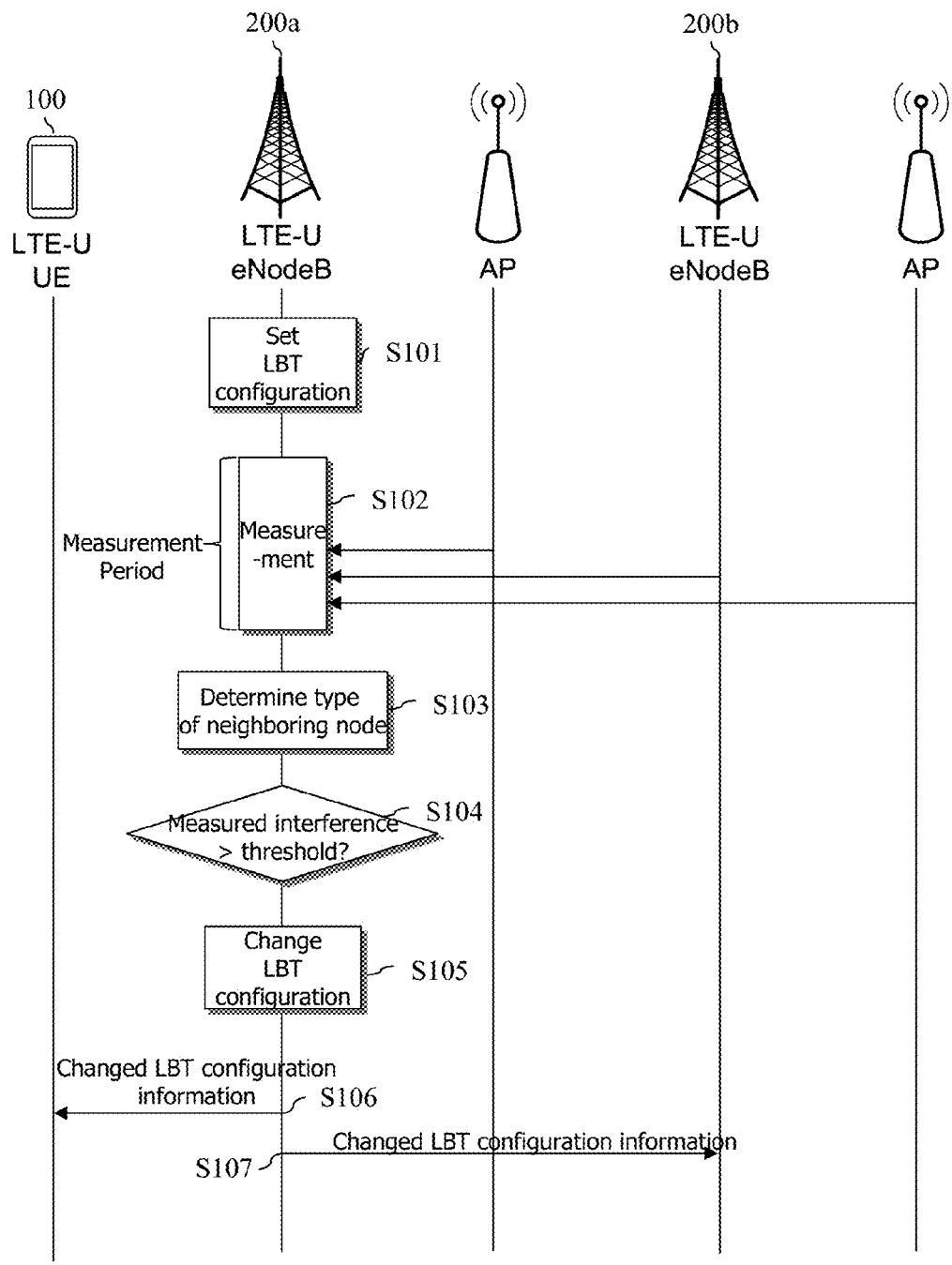
FIG. 10 is a diagram illustrating an example of a method of changing LBT configuration according to an embodiment of the present disclosure.

The above-described method of changing LBT configuration according to measurement of interference may be summarized with reference to FIG. 10.

FIG. 10 is a diagram illustrating an example of a method of changing LBT configuration according to an embodiment of the present disclosure.

Referring to FIG. 10, LBT configuration information/change unit information may be set in advance or may be set in an upper layer as a default setting in a serving base station (LTE-U eNodeB) 200a of an LTE-U UE 100 in S101.

The serving base station 200a detects a signal (e.g., a preamble or a known signal) from a neighboring node over a preset period to be measured, and measures interference caused by the detected signal in S102.

Then, the serving base station 200a may determine a type of the neighboring communication node (e.g., an LTE node/a Non-LTE node, an inter operator LIE base station/a WLAN node, an LTE base station of the same group/an LTE base station of a different group/a WLAN node) corresponding to the detected signal in S103.

In addition, the serving base station 200a compares the measured interference with a threshold set according to a type of the communication node corresponding to the measured interference in S104. The threshold for the interference source may be set in an upper layer.

If the measured interference is greater than the threshold, the serving base station 200a may consider that a different communication node has been detected. Here, if a preset or shared preamble or a known signal exits, power of the interference may be excluded. At this point, power of the preamble or the known signal is excluded only when the preamble or the known signal has been detected.

Meanwhile, if the interference is smaller than the threshold, it may be considered that the different communication node has not been detected.

The serving base station 200a may, again, determine a type of a system (whether the system is an LTE/WLAN/Non-LTE, an intra/inter-operator, the same base station/cell group, etc.) corresponding to interference greater than the threshold. Alternatively, the type of the system determined in the previous step S103 may be used.

The serving base station 200a may change LBT configuration or other parameters according to a type of a system corresponding to the interference in S105.

Specifically, the serving base station 200a may increase the length of the CS/LBT period. In addition, the serving base station 200a may increase CS frequency/BLT frequency, increase the maximum length of the back-off period, or reduce the length of the RRP. If any of those values is beyond its maximum or minimum value, the value may be set as the minimum or minimum value.

In another example, the serving base station 200a may set the length of the CS/LBT period, CS/LBT frequency, the maximum length of the back off period, and the length of the RRP as their respective default values which are set in the first place.

Alternatively, the serving base station 200a may reduce the length of the CS/LBT period. Specifically, the serving base station 200a may reduce the CS frequency/LBT frequency, reduce the maximum length of the back off period, or increase the length of the RRP. If any of those values is beyond its maximum or minimum value, the value may be set as its maximum or minimum value.

The serving base station 200a may determine, based on a measurement result, that a corresponding unlicensed band is busy, and then may not transmit data. That is, the serving base station 200a may perform CS without configuring RRP.

Alternatively, the serving base station 200a may determine, based on a measurement result, whether a corresponding band is idle, and then may (prepare to) transmit data. In other words, the serving base station 200a may consider a procedure of configuring RRP in the corresponding unlicensed band.

Meanwhile, the serving base station 200a may transmit the changed LBT configuration information to the UE by an upper layer signal in S106.

Then, the UE 100 may set a measurement period and a measurement method based on the LBT configuration information. In addition, the UE may re-set an (E)PDCCH monitoring region.

Meanwhile, the serving base station 200a may share the changed LBT configuration information with a base station group on a network by a backhaul signal in S107.

The base station indicated throughout the present disclosure may be a term that includes a Remote Radio Head (RRH), a base station, a Transmission Point (TP), a Reception Point (RP), a relay, etc.

The above-described embodiments of the present invention may be implemented by any of various means. For example, the embodiments of the present invention may be implemented by hardware, firmware, software, or a combination thereof. Detailed description thereof will be provided with reference with drawings.

Figure 11:
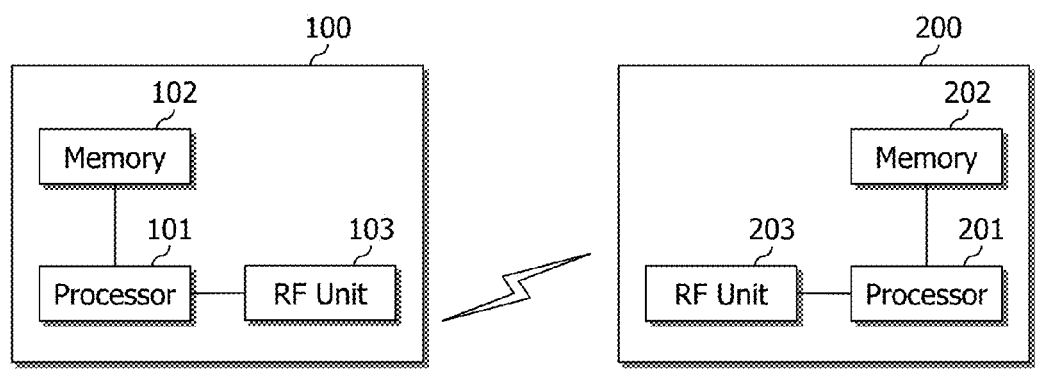
FIG. 11 is a block diagram illustrating a wireless communication system which implements an embodiment of the present disclosure.

FIG. 11 is a block diagram illustrating a wireless communication system which implements an embodiment of the present disclosure.

A base station 200 include a processor 201, a memory 202, and an Radio Frequency (RF) unit 203. The memory 202 is connected to the processor 201 to store various types of information required to drive the processor 201. The RF unit 203 is connected to the processor 201 to transmit and/or receive a wireless signal. The processor 201 implements the proposed function, procedure, and/or method. Operation of the base station in the above-described embodiments may be implemented by the processor 201.

The UE 100 includes a processor 101, a memory 102, and an RF unit 103. The memory 102 is connected to the processor 101 to store various types of information required to drive the processor 101. The RF unit 103 is connected to the processor 101 to transmit and/or receive a wireless signal. The processor 101 implements the proposed function, procedure, and/or method.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting data in an unlicensed band, the method performed by a Long Term Evolution Advanced (LTE-A)-based base station and comprising:
   before transmitting the data in the unlicensed band, setting, by the base station, Listen Before Talk (LBT) configuration to determine whether other nodes transmit signals or not;
   measuring, by the base station, interference caused by the signals from the other nodes for a preset measurement period;
   comparing the measured interference with a preset threshold;
   changing the LBT configuration according to the comparison; and
   transmitting the changed LBT configuration to a terminal.

2. The method of claim 1, wherein the LBT configuration comprises one or more of the following:
   information on a Carrier Sensing (CS) period in which whether the unlicensed band is busy due to the other nodes is checked;
   information on a frequency of the unlicensed band;
   information on operation in a case where the unlicensed band is busy due to the other nodes;
   information on a Reserved Resource Period (RRP) that is a period in which the base station is capable of transmitting and receiving the data in the unlicensed band;
   information on a period length between an ending point of the RRP and a start point of a next CS period or a next RRP;
   RRP start timing information;
   information on an Inter-System Measurement Gap (ISMG); and
   information on a threshold for interference.

3. The method of claim 2, wherein the changing of the LBT configuration comprises changing the LBT configuration according to a type of a different node which causes interference greater than the preset threshold.

4. The method of claim 1, further comprising,
   determining, in response to the interference greater than the preset threshold, whether the unlicensed band is busy,
   wherein, in response to a determination that the unlicensed band is busy, data transmission is not performed.

5. The method of claim 1, further comprising: determining, in response to the interference smaller than the present threshold, whether the unlicensed band is idle, wherein, in response to a determination that the unlicensed band is idle, data transmission is prepared.

6. The method of claim 1, wherein the changing of the LBT configuration comprises gradually changing the LBT configuration according to size of the interference.

7. A Long Term Evolution Advanced (LTE-A)-based base station which transmits data in an unlicensed band, the base station comprises:
 a Radio Frequency (RF) transceiver; and
 a processor configured to control the RF transceiver,
 wherein the processor performs the following operations:
  before transmitting the data in the unlicensed band, setting Listen Before Talk (LBT) configuration required to determine whether to transmit signals of other nodes;
  measuring, by the base station, interference caused by the signals from the other node for a preset measurement period;
  comparing the measured interference with a preset threshold;
  changing the LBT configuration according to the comparison; and
  transmitting the changed LBT configuration to a terminal.

8. The base station of claim 7, wherein the LBT configuration comprises one or more of the following:
 information on a Carrier Sensing (CS) period in which whether the unlicensed band is busy due to the other nodes is checked;
 information on a frequency of the unlicensed band;
 information on operation in a case where the unlicensed band is busy due to the other nodes;
 information on a Reserved Resource Period (RRP) that is a period in which the base station is capable of transmitting and receiving the data in the unlicensed band;
 information on a period length between an ending point of the RRP and a start point of a next CS period or a next RRP;
 RRP start timing information;
 information on an Inter-System Measurement Gap (ISMG); and
 information on a threshold for interference.

9. The base station of claim 8, wherein the changing of the LBT configuration comprises changing the LBT configuration according to a type of a different node which causes interference greater than the preset threshold.

10. The base station of claim 7,
 wherein, in response to the interference greater than the preset threshold, whether the unlicensed band is busy is determined, and
 wherein, in response to a determination that the unlicensed band is busy, data transmission is not performed.

11. The base station of claim 7,
 wherein, in response to the interference smaller than the present threshold, whether the unlicensed band is idle is determined, and
 wherein, in response to a determination that the unlicensed band is idle, data transmission is prepared.

12. The base station of claim 7, wherein the changing of the LBT configuration comprises gradually changing the LBT configuration according to size of the interference.

* * * * *